L. H. COBB.
BICYCLE FRAME.
APPLICATION FILED JAN. 28, 1913.
1,121,168.
Patented Dec. 15, 1914.
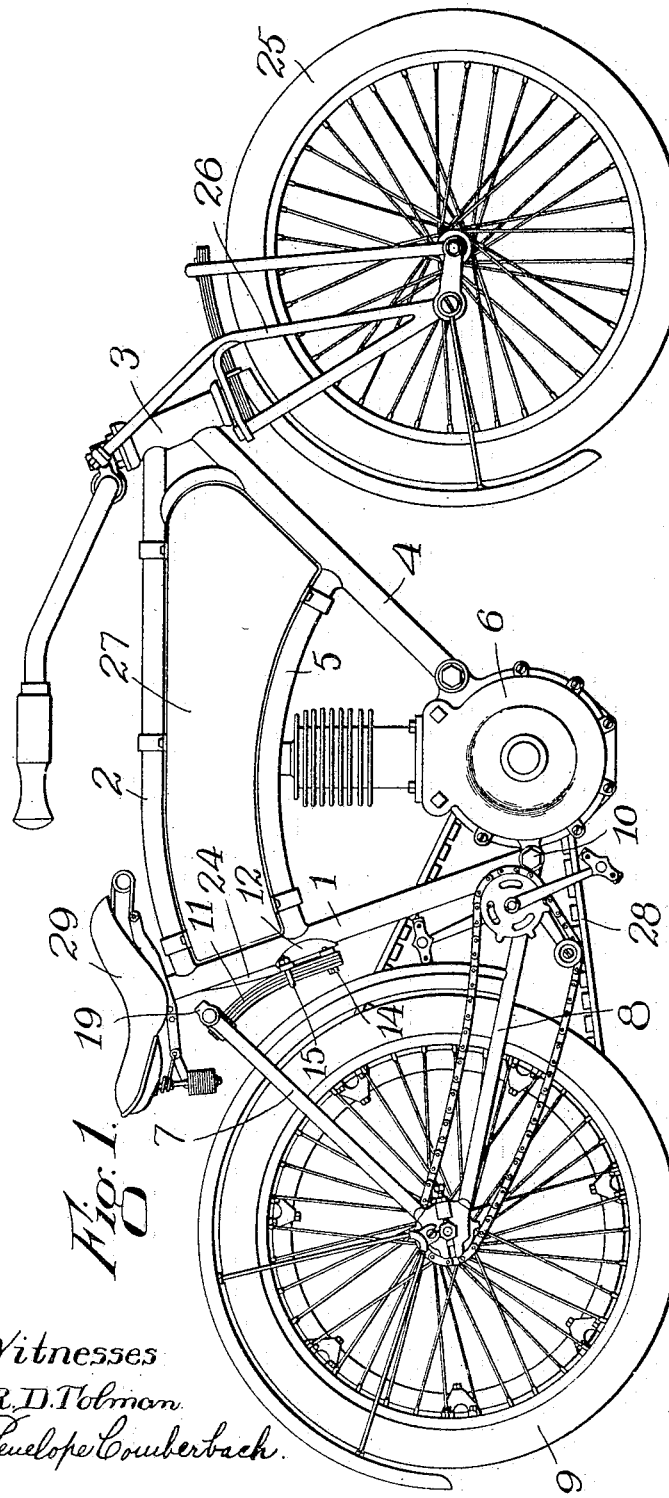
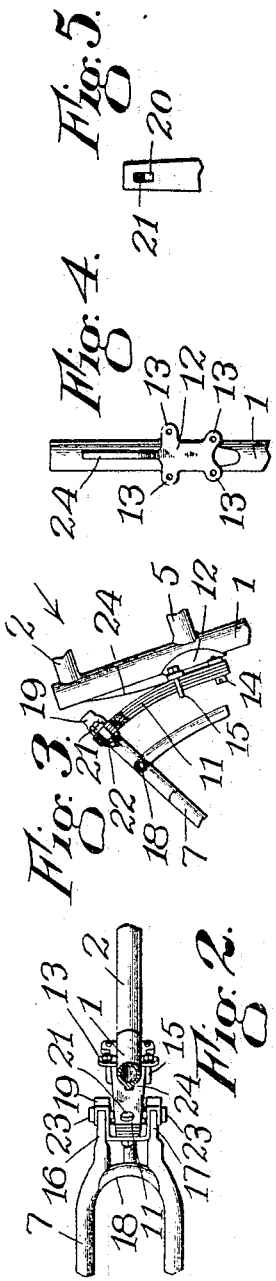
Witnesses
R. D. Tolman
Penelope Cumberbach
Inventor
Lyman H. Cobb.
By Ralph E. Atherton
Attorney

UNITED STATES PATENT OFFICE.

LYMAN H. COBB, OF FITCHBURG, MASSACHUSETTS, ASSIGNOR TO MARY ELIZABETH JOHNSON, TRUSTEE, OF FITCHBURG, MASSACHUSETTS.

BICYCLE-FRAME.

1,121,168. Specification of Letters Patent. Patented Dec. 15, 1914.

Application filed January 28, 1913. Serial No. 744,643.

*To all whom it may concern:*

Be it known that I, LYMAN H. COBB, a citizen of the United States, residing at Fitchburg, in the county of Worcester and Commonwealth of Massachusetts, have invented new and useful Improvements in Bicycle-Frames, of which the following, together with the accompanying drawing, is a specification.
My invention relates to bicycle frames and more particularly to frames for use in connection with motorcycles.

In the case of motorcycles particularly, the frame of the machine is necessarily designed to carry considerable weight and, in order that jar and vibration may be absorbed by the machine so as not to be transmitted to the rider and the motor, it is common to provide a frame which is more or less resilient.

One object of the invention is to provide an improved form of resilient frame for this purpose which shall be strong and simple in construction.
While a frame constructed in accordance with my invention is particularly adapted for use in motorcycles, it is obvious that it may be used to advantage in ordinary bicycles.
Other objects of the invention reside in certain details of construction as pointed out in the appended claims and as shown in the accompanying drawing, in which—

Figure 1 is a side view of a motorcycle with a resilient frame constructed in accordance with my invention; Fig. 2 is a plan view of my peculiar resilient connection, the saddle and the upper end of the seat post tube being removed; Fig. 3 is a side view of the resilient connection, a portion being in section to show details of construction; Fig. 4 is a rear view of the upper end of the seat post tube, showing a peculiarly formed member carried thereby for supporting the spring portion of the connection; and Fig. 5 is a view of the upper face of the spring portion of the connection looking in the direction of the arrow of Fig. 3, the head of the bolt in the upper end of the spring being removed to show the cross sectional shape of the bolt.

Like reference characters refer to similar parts in the different figures.

A motorcycle is shown in the drawing for the purpose of illustrating the principles of the invention. The main portion of the frame of the motorcycle includes a seat post tube 1, a backbone 2, a head 3, a front brace 4 and a cross brace 5. A motor 6 for driving the machine is carried as usual by the lower part of this portion of the frame. The rear portion of the frame includes a rear fork 7 and a lower rear brace 8, this fork and brace being rigidly connected where they meet at the axle of the rear wheel 9. The upper end of the fork 7 is connected with the seat post tube 1 by a resilient connection which embodies the principles of the present invention and, in order that there may be relative movement between this fork and the seat post tube, the forward end of the brace 8 is pivotally connected at 10 to the lower end of the seat post tube 1 and so to the main portion of the frame.

A spring 11 is supported at its lower end by a peculiarly constructed member 12 rigidly attached, preferably by brazing, to the rear face of the upper end of the seat post tube 1. The spring 11 consists of a plurality of leaf springs, its lower end being secured to the lower or main portion of the supporting member 12 so as to lie approximately parallel to the axis of the seat post tube 1. The lower end of the supporting member 12 has a broad flat face for the spring 11 to rest against and is provided with lateral perforated ears 13 through which bolts 14 and a U-bolt 15 pass for the purpose of securing the spring 11 in place.

The fork 7 terminates at its upper end in two spaced and somewhat flattened extremities 16 and 17, the two sides of the fork being connected a short distance below these extremities by a cross brace 18.

The upper portion of the spring 11 is curved rearwardly away from the seat post tube 1, and its upper end rests upon a U-shaped saddle 19 pivotally supported by the upper extremities 16 and 17 of the rear fork 7. The individual leaves of the spring 11 are of substantially the same length and through the upper ends of the leaves is formed an elongated opening 20 to accommodate a bolt 21 which secures them to the saddle 19, an opening for the bolt being also provided in the base of the saddle in alinement with the opening 20.

The portion of the bolt 21 within the opening 20 is rectangular in cross section and is larger than the circular nut end of the bolt so as to provide a shoulder 22 to bear against the upper face of the base of the saddle 19. The rectangular portion of the bolt 21 is slightly longer than the combined thickness of the leaves of the spring 11, so that the leaves may be secured loosely to the saddle 19 to permit them to slide upon each other as they are bent back and forth while in use. The elongation of the opening 20 in the leaves is also for the purpose of permitting this relative sliding movement of the upper ends of the leaves, this feature also further permitting relative movement of the upper end of the fork 7 and the spring 11 as a whole. The arms or sides of the saddle 19 terminate in hook-shaped extremities which engage over the the upper ends of the extremities 16 and 17 of the fork 7, a pin or bolt 23 being passed through the opposed sides of each of these hooks and through the upper end of the corresponding extremity of the fork 7, the saddle being thus pivotally supported.

The upper portion of the spring supporting member 12 consists of a narrow upwardly tapering rib 24 lying between the seat post tube 1 and the free upper portion of the spring 11. This rib is sufficiently thick at its lower end to fill completely the space between the seat post tube and the spring, but tapers gradually to a point approximately opposite the upper end of the spring. The edge of the rib 24 constitutes a stop or support for the upper face of the free portion of the spring 11, it being clear that more and more of the spring will come into contact with the rib as it is straightened, thus gradually decreasing the effective length of the free portion of the spring 11. As a spring is shortened, assuming that its cross section and other characteristics remain the same, the resistance which it offers to a bending force increases and it follows that, with the rib or stop 24 present, the spring 11 may be made weaker and, therefore, more resilient than would otherwise be practicable. A further important function of the rib 24 is to prevent sudden contact of the free end of the spring 11 with the adjacent portion of the seat post tube 1 as the machine passes over unusually rough places. Under such conditions, the free curved portion of the spring 11 will be straightened or bent considerably toward the seat post tube, but its strength will be increased at the same time to such an extent as most probably to prevent contact between its upper end and the seat post tube and, in any event, it will prevent the possibility of contact sufficiently violent to be objectionable.

Certain parts of the machine, such as the front wheel 25, the front fork 26, the fuel tank 27, the driving belt 28 and the saddle 29, while shown in the drawing, are not involved in the present invention and so will not be described in detail.

While I have illustrated the principles of my invention by showing and describing the details of one form thereof, I do not wish to be limited to such details as it is obvious that certain changes may be made within the scope of the appended claims without departing from the spirit of the invention; but

What I claim as new and desire to secure by Letters Patent is:

1. A bicycle frame including a seat post tube, a rear fork, a spring connecting the seat post tube and the rear fork, and a stop between the spring and the seat post tube to decrease the effective length of the spring as it is bent toward the seat post tube.

2. A bicycle frame including a seat post tube, a rear fork, a spring connecting the seat post tube and the rear fork, and a rib between the spring and the seat post tube to decrease the effective length of the spring as it is bent toward the seat post tube.

3. A bicycle frame including a seat post tube, a rear fork, a spring connecting the seat post tube and the rear fork, and a tapered rib between the spring and the seat post tube to decrease the effective length of the spring as it is bent toward the seat post tube.

4. A bicycle frame including a seat post tube, a lower rear brace pivoted at the lower end of the seat post tube, a rear fork, a spring connecting the seat post tube and the rear fork, and a stop between the spring and the seat post tube to decrease the effective length of the spring as it is bent toward the seat post tube.

5. A bicycle frame including a seat post tube, a rear fork having two spaced upper extremities, a U-shaped saddle with its arms attached respectively to said extremities of the rear fork, whereby the saddle is suspended between said two extremities of the rear fork, and a spring having one end secured to the seat post tube and the other end carried by the saddle.

6. A bicycle frame including a seat post tube, a rear fork having two spaced upper extremities, a U-shaped saddle pivotally suspended between said two extremities of the rear fork, and a spring having one end secured to the seat post tube and the other end carried by the saddle.

7. A bicycle frame including a seat post tube, a rear fork having two spaced upper extremities, a U-shaped saddle having hook shaped ends engaging over the extremities of the rear fork and secured thereto, and a spring having one end secured to the seat post tube and the other end carried by the saddle.

8. A bicycle frame including a seat post tube, a rear fork having two spaced upper extremities, a U-shaped saddle having hook shaped ends engaging over the extremities of the rear fork and pivoted thereto, and a spring having one end secured to the seat post tube and the other end carried by the saddle.

9. A bicycle frame including a seat post tube, a rear fork, a spring having a plurality of leaves of substantially the same length, one end of the spring being secured to the seat post tube and the other end being provided with an elongated opening passing through the leaves, a member carried by the rear fork and having an opening in line with the opening in the spring, and a bolt passing through said openings to secure the spring to said member, the bolt having a shoulder engaging said member to allow the leaves of the spring to have relative sliding movement as they are bent.

Dated this 24th day of January 1913.

LYMAN H. COBB.

Witnesses:
PENELOPE COMBERBACH,
NELLIE WHALEN.

Copies of this patent may be obtained for five cents each, by addressing the "Commissioner of Patents, Washington, D. C."